Feb. 7, 1950     G. T. CHAPMAN     2,496,334
FISHING FLOAT
Filed Oct. 25, 1945     2 Sheets-Sheet 1
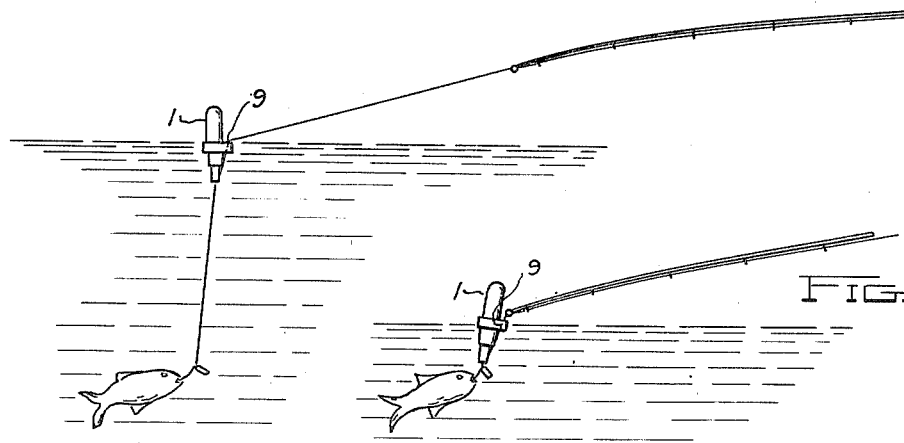
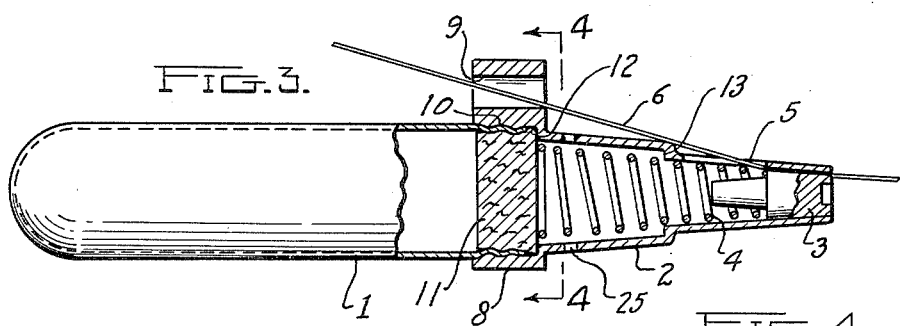
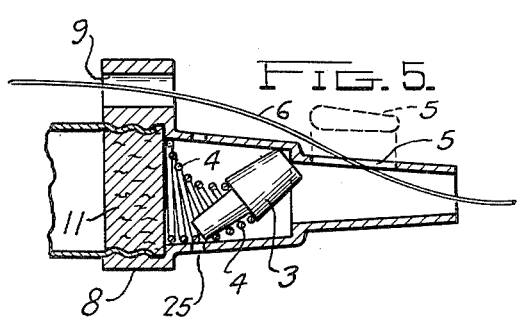
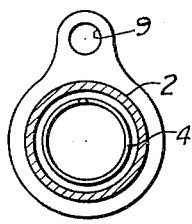
INVENTOR
GEORGE T. CHAPMAN
BY
Barnes, Kisselle, Laughlin & Raisch
ATTORNEYS Feb. 7, 1950
G. T. CHAPMAN
2,496,334
FISHING FLOAT
Filed Oct. 25, 1945
2 Sheets-Sheet 2
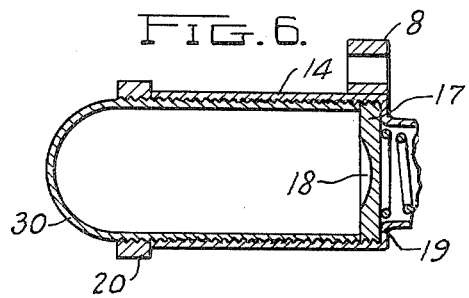
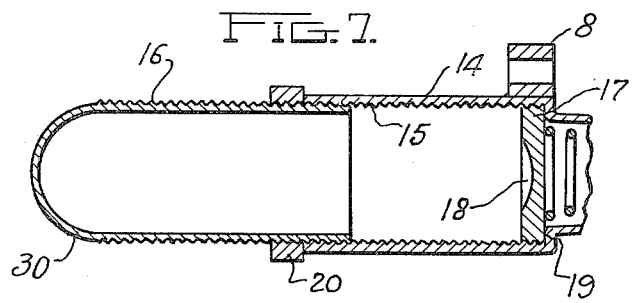
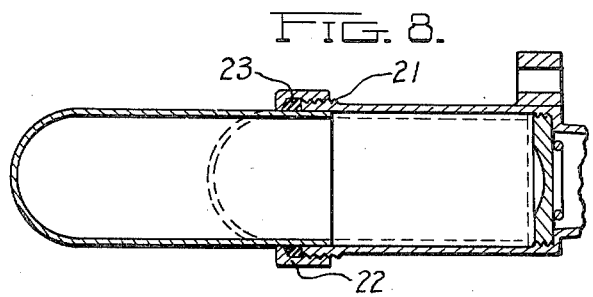
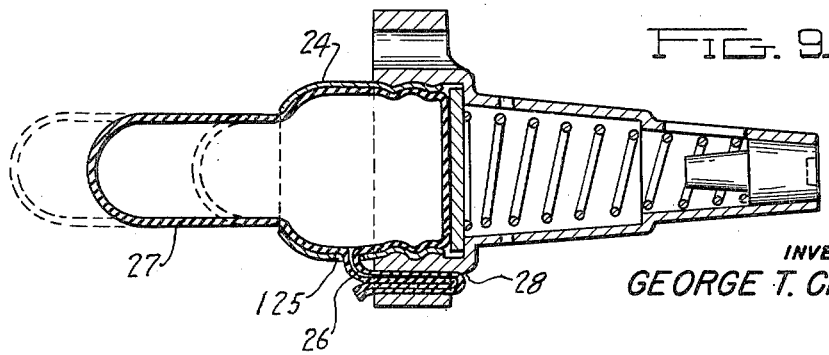
INVENTOR
GEORGE T. CHAPMAN
BY
Barnes, Kisselle, Laughlin & Raisch
ATTORNEYS Patented Feb. 7, 1950

2,496,334

UNITED STATES PATENT OFFICE 2,496,334

FISHING FLOAT

George T. Chapman, Grosse Pointe, Mich.

Application October 25, 1945, Serial No. 624,341

9 Claims. (Cl. 43—49)

This invention relates to a fishing float and has for its object an improvement over the fishing float described and claimed in my United States Patent No. 2,376,958, dated May 29, 1945.

It is the object of the present improvement to afford a float which is, in attractiveness and efficaciousness, the equal of the float of Patent No. 2,376,958, but is simpler and cheaper to manufacture than this float.

Referring to the drawings:

Fig. 1 shows my float in use with the fish at the time of the strike.

Fig. 2 shows how the line with the fish on the hook can be reeled in.

Fig. 3 is a longitudinal section of the float.

Fig. 4 is a section on the line 4—4 of Fig. 3.

Fig. 5 is a fragmentary longitudinal section showing the spring-pressed locking plunger in released position.

Figs. 6, 7 and 8 are longitudinal sections showing modified forms of the float with an adjustable air chamber.

Fig. 9 is a longitudinal section of a modified form of the float in which the air chamber takes the form of an air bladder or balloon type of chamber.

The type of float shown in my prior patent involves the use of a spring-pressed plug or plunger of the tapered type which cooperates with the tapered shell to form a lock on the line when an endeavor is made to pull the line out, but which permits the line to be drawn in as, for instance, in reeling in the bait or reeling in the fish after the strike.

In Fig. 1 a float has been locked on the line to give the bait the desired depth. In Fig. 2 it is shown how the fish can be reeled in. First the float, the line and the fish are reeled in until the float strikes the end of the rod, thereupon the tapered locking plunger allows the line to continue to be reeled in, bringing the fish in as far as desirable. In Fig. 2 the fish is shown reeled right up to the locking plunger but of course in actual practice this might not be true in all cases because the fish would only be reeled up to a point where it could be caught in the landing net or lifted into the boat or onto land.

With my float shown in my prior patent, if one wanted to adjust the bait on the line or draw the leader through the float so as to disengage the float from the line, it was either necessary to push and hold back the locking plunger by some sort of tool, such as a screw driver or knife, or in another form of the invention, shown in Figs. 10 to 14, inclusive of said prior patent, I provided a separate locking plunger arranged to engage in the second opening in the tapered shell when the plunger is pushed back. As explained in this patent, this plunger arrangement for locking the plunger in the released position may be used in casting. In this arrangement, as explained in my prior patent, the line may be knotted around a small stick or bar which is tied to the line to give the desired depth to the bait. The locking plunger is locked in the released position and, consequently, the float is slidable on the line between the knot and the hook or sinker. When one casts the bait outwardly the float slides down to the sinker or bait to increase the weight of the end of the line giving much greater weight to the end of the line and making the cast much easier as a heavier weight is easier to throw out. This heavier object also pulls the line out bettter as it gives it much better pull on the reel.

When the bait, sinker and float strike the water the sinker and bait sink until the line with the object tied thereon strikes the eye of the float. The float will remain afloat, and the bait, line and sinker will assume the desired depth in the water.

In my new float I have provided a very simple way to achieve this set release for the locking plunger. Referring to Fig. 3, I designates the air chamber shell preferably made of plastic, such as a transparent red. 2 is the housing which is preferably made of plastic, such as a molded transparent green. The locking plunger 3 may be of molded clear plastic or any other suitable material. It is pressed into its locking position by the helical spring 4. The tapered shell has a tear-drop opening 5 in its side through which the line 6 and leader pass. The line 6 also passes through an eye or lever 9 in the ring portion 8 of the tapered shell or housing. It will be noted that by reason of the tapered locking plunger and the tapered shell any attempt to pull the line 6 in or to the left in Fig. 3 will meet with no difficulty because this tends to release the tapered locking plunger 3 from the line. Consequently, that line or the line and the fish may be reeled in as shown by comparing Figs. 1 and 2. On the contrary, any attempt to pull the line out or to the right tends to pull the tapered locking plunger tightly into engagement with its tapered housing and, consequently, affords an effective lock. The result is, while the line may be reeled in with the fish thereon, the fish cannot pull the line out through the float without submerging the float. The float therefore adds an additional braking action for any attempt of the fish to run with the line after the strike. However, should the float foul in the weeds or on some other obstruction, movement of the line will be restricted but not locked tight enough to cause the line to break.

The ring portion 8 of the tapered shell is internally threaded by coarse, shallow, large threads such as are now used on many glass and paper containers. These threads are designated 10 and are molded into the ring member. The air chamber housing or shell 1 has similar threads. A tapered cork plug 11 fits or screws into the threaded end of the air chamber shell and when the housing 2 is screwed onto the threads of the air chamber shell the shoulder 12 forces the cork plug firmly into the end of the air chamber shell. By reason of the slight taper of the cork, this forms an effective seal for the shell to make it water tight. The tapered housing 2 is provided with a molded shoulder 13 about in the midportion of the shell. This forms a seat for the locking plunger 3 when the locking plunger is pressed back and cocked in the enlarged chamber of the tapered housing, as shown in Fig. 5. The distorted spring 4 presses the cocked locking plunger against the shoulder, and this shoulder holds the locking plunger set in released position, as shown in Fig. 5. This is a very simple way of locking the plunger in the released position so as to be able to remove the line and leader, if this is desired, or to use the float as a sliding float for casting in the way already above described.

In order to vary the buoyancy of the float, I have found it desirable to provide an adjustable air chamber. This can be done by providing the tapered housing with an extension 14 beyond the ring 8. This is internally threaded at 15 for its entire length. The shell 30 is externally threaded at 16 for substantially its entire length. A sealing nut or disc 17 is screwed into the interior of the extension 14 and turned down with a screw driver in the slot 18 until it abuts firmly against the shoulder 19 of the tapered housing. The shell 30 is screwed into the extension 14 to any desired depth (see Figs. 6 and 7). The locking or jamb nut 20 then is turned down to lock the two tubular members in the desired position. Fig. 6 shows the float chamber at its minimum capacity and Fig. 7 at about its maximum capacity.

Fig. 8 shows a still further modification. The full lines show the air chamber in its maximum capacity and the dotted lines the minimum capacity. Here only a small portion of increased diameter on the extension is threaded, as at 21, and the cap nut 22 with the packing gland 23 is used to hold the two parts in any desired position of adjustment, the packing gland also acting as a sealing member.

In the modification shown in Fig. 9, a thimble 24 with a turned-in outer edge is screwed into the tapered housing. This thimble has an opening 125 to receive the filling tube 26 of a rubber or synthetic-rubber air bladder 27. After the collapsed bladder has been placed in the thimble 24 with the tube out, it is blown up and the tube folded and crowded in the passage 28 to seal the tube.

By having the line guide in the form of an eye or a lever 9, as shown in Figs. 1 and 3, this forms a lever arm on the float tending to resist the float turning around and twisting the line when the live fish bait swings around in circles as it is likely to do. The point where the line passes through the float provides a center on which the fish with the line tends to swivel while the outstanding lever arm which is held tight by the taut line from the end of the rod tends to resist any twisting of the float and thereby twisting of the line.

What I claim is:

1. A float for use with a fishing line comprising a pair of housings fastened together but in divided and water-sealed relation, one of the housings forming an air chamber and the other forming a water chamber having at the outer end a conical interior portion and having an orifice through which the fishing line and leader can pass, the interior also provided with an obstruction, a tapered locking plunger, and a spring for normally projecting the tapered locking plunger into tight relation with the conical interior at the end of the housing, the said obstruction serving, when the locking plunger is pressed back and cocked, to hold, with the aid of the spring, the locking plunger in released position.

2. A float for use with a fishing line comprising a pair of housings fastened together but in divided and water-sealed relation, one of the housings forming an air chamber and the other forming a water chamber having at the outer end a conical interior portion and having an orifice through which the fishing line and leader can pass, the interior also provided with a shoulder, a tapered locking plunger, and a spring for normally projecting the tapered locking plunger into tight relation with the conical interior at the end of the housing, the said shoulder serving, when the locking plunger is pressed back and cocked, to hold, with the aid of the spring, the locking plunger in released position.

3. A float for use with a fishing line comprising, a pair of housings fastened together but in divided and water-sealed relation, one of the housings forming an air chamber and the other forming a water chamber having at the outer end a conical interior portion and having an orifice through which the fishing line and leader can pass, a tapered locking plunger, a spring for normally projecting the tapered locking plunger into tight relation with the conical interior at the end of the housing, and means for holding the locking plunger in set and released relation with the aid of the spring when the locking plunger is cocked crosswise of the interior of the water chamber.

4. In a float for use with a fishing line, the combination of two housings, one of which forms part of an air chamber and the other of which is provided with a water chamber and an extension, said extension sealed from the water chamber, and the said air chamber housing member and said extension arranged in telescopically adjustable relation to vary the capacity of the air chamber, and means for locking the same in said adjustable relation.

5. In a float for use with a fishing line, the combination of two housings, one of which forms part of an air chamber and the other of which is provided with a water chamber and an extension, said extension sealed from the water chamber, and the said air chamber housing member and said extension arranged in telescopically adjustable relation to vary the capacity of the air chamber, and means for holding the same in said adjustable relation, the said means comprising threads on the interior of the extension, interengaging threads on the exterior of the air chamber member, and a lock nut.

6. In a float for use with a fishing line, the combination of two housings, one of which forms part of an air chamber and the other of which is provided with a water chamber and an extension, said extension sealed from the water chamber, and the said air chamber housing member and said extension arranged in telescopically adjustable relation to vary the capacity of the air chamber, and means for holding the same in said adjustable relation, the said means comprising threads on the exterior of the extension, a cap nut engaging said threads, and a packing gland interposed between the nut and the air chamber housing member.

7. A float for a fishing line comprising a plastic housing member in the form of a tapered shell having an orifice in its side and at its outer end an opening, a tapered or conical wall leading to said opening, and provided at the other end with an enlargement in the form of a ring having large interior threads, and a second housing forming an air chamber comprising a hollow body with a closed outer end and an open inner end, the open end having large threads adapted to engage the large threads of the interior of the ring member, a cork or sealing member fitting into the open end of this last-mentioned housing, a coiled spring contained within the plastic housing, and a tapered locking plunger adapted to be pushed by said spring into the conical interior portion of the plastic housing to restrict the movement in one direction of a line passing through said orifice in the plastic housing.

8. A float for a fishing line comprising a housing member arranged to contain water and provided with an open outer end and an orifice in the side for the passage of the line and leader, a locking plunger having a tapered portion adapted to engage in wedging relation with the open end of the housing, a spring for normally maintaining the locking plunger in this position, the inner end of the housing having an enlargement, a thimble fitted into said enlargement, a rubber air bladder supported in said thimble when inflated, and means by which the filling tube of the bladder may be held in tight, pinched relation to seal the air in the bladder.

9. A float for a fishing line comprising a housing member arranged to contain water and provided with an open outer end and an orifice in the side for the passage of the line and leader, a locking plunger having a tapered portion adapted to engage in wedging relation with the open end of the housing, a spring for normally maintaining the locking plunger in this position, the inner end of the housing having an enlargement, a thimble fitted into said enlargement and having a turned-in outer end, and a rubber air bladder supported in said thimble when inflated.

GEORGE T. CHAPMAN.

REFERENCES CITED

The following references are of record in the file of this patent:

UNITED STATES PATENTS

| Number | Name | Date |
| --- | --- | --- |
| 1,980,302 | Taylor | Nov. 13, 1934 |
| 2,052,262 | Walberg | Aug. 25, 1936 |
| 2,376,958 | Chapman | May 29, 1945 |